Sept. 16, 1969            R. E. JAMES            3,467,028
ADJUSTABLE LOAD DIVIDER
Filed Aug 11, 1967            3 Sheets-Sheet 1
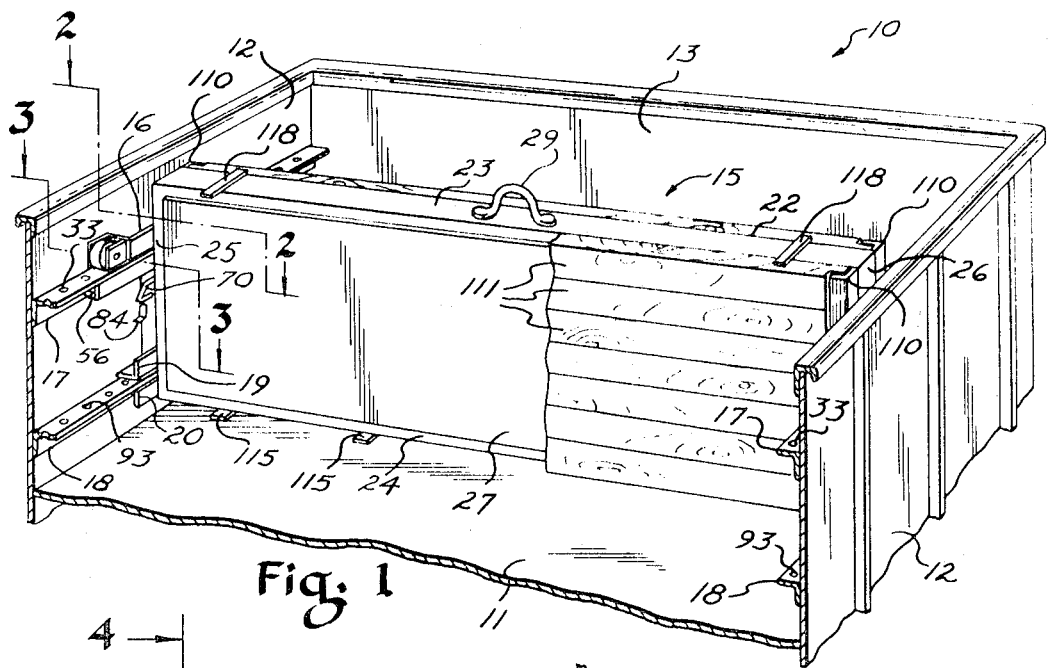
Fig. 1
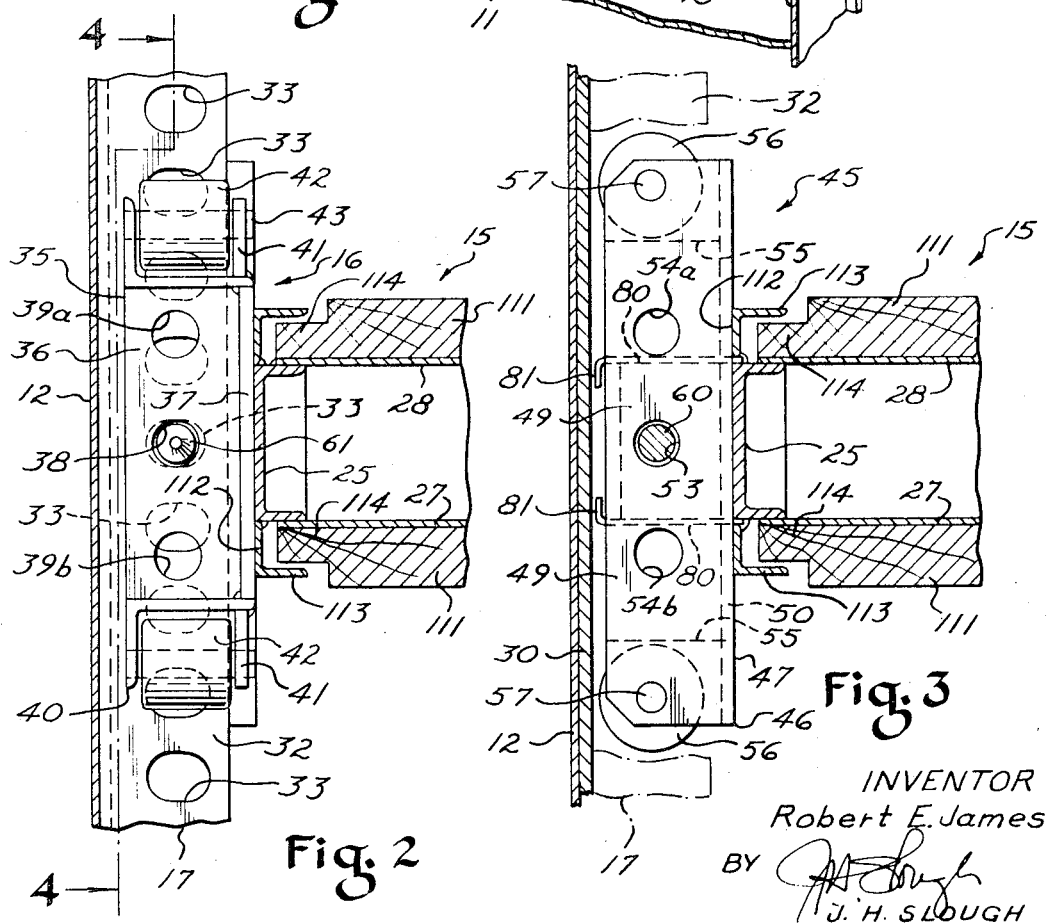
Fig. 2            Fig. 3
INVENTOR
Robert E. James
BY 
J. H. SLOUGH
ATTORNEY

United States Patent Office 3,467,028
Patented Sept. 16, 1969

3,467,028
ADJUSTABLE LOAD DIVIDER
Robert E. James, Parma Heights, Ohio, assignor to The Shunk Manufacturing Company, Inc., Bucyrus, Ohio, a corporation of Ohio
Filed Aug. 11, 1967, Ser. No. 660,029
Int. Cl. B61d *45/00;* B60p *7/14;* E05d *13/02*
U.S. Cl. 105—376                                         11 Claims

ABSTRACT OF THE DISCLOSURE

A load dividing transverse bulkhead is mounted for movement longitudinally of a transport vehicle on rails carried by opposite side walls of the vehicle. The rails are provided with a plurality of spaced openings, and pins are carried by the bulkhead for engaging the openings to lock the bulkhead in an adjusted position. Means bias the pins toward the openings and means are provided for retaining the pins in a retracted position whereby whenever the bulkhead is jolted, the pins are released to engage the openings.

---

This invention relates generally to load dividers or movable bulkheads for use in transport vehicles, for example trucks, trailers, railroad cars or other freight transporting means and relates particularly to bulkheads adapted to be adjustably locked to lineal rails on opposed side walls of said vehicles, particularly railroad cars.

The provision of movable, space-dividing bulkheads for a cargo carrying enclosure presents problems concerning movement and manipulation of the bulkhead, strength to withstand great and sudden pressures, adaptability for dividing the space into a variety of different sized compartments, maintaining suitable working tolerances between the bulkhead and the enclosure over a long period of time, and the tendency for the bulkhead to shift dangerously when the enclosure is empty and the vehicle is suddenly stopped or started. It is a general object of this invention to provide an adjustable, load dividing bulkhead which satisfactorily solves the above referred to problems.

More specifically, it is an object of the invention to provide means for mounting a bulkhead of the type referred to in rolling engagement with rails on the side walls of the car which will effectively maintain said bulkhead against skewing and afford free movement thereof from one position to another.

Another object is to provide a bulkhead of the type referred to having simple and effective means for maintaining said bulkhead in any adjusted position on lineal side rails of the car in such manner as to withstand considerable pressures and loading shock.

Still another object of the invention is to provide improved locking means for an adjustable bulkhead of the type referred to which will automatically lock said bulkhead and prevent dangerous shifting thereof if the vehicle is suddenly stopped or started.

Other objects of the invention and the invention itself will be readily understood from the following description of the invention and the accompanying drawings, in which said drawings:

FIGURE 1 is a perspective view of an end portion of a gondola type railroad car showing an embodiment of the bulkhead of the present invention mounted therein;

FIGURE 2 is an enlarged fragmentary section taken generally along the line 2—2 of FIGURES 1 showing a top plan view of a load carrying carriage assembly of FIGURE 1;

FIGURE 3 is an enlarged fragmentary section taken generally along the line 3—3 of FIGURE 1 showing a top plan view of a stabilizing carriage assembly of FIGURE 1;

Figure 4:
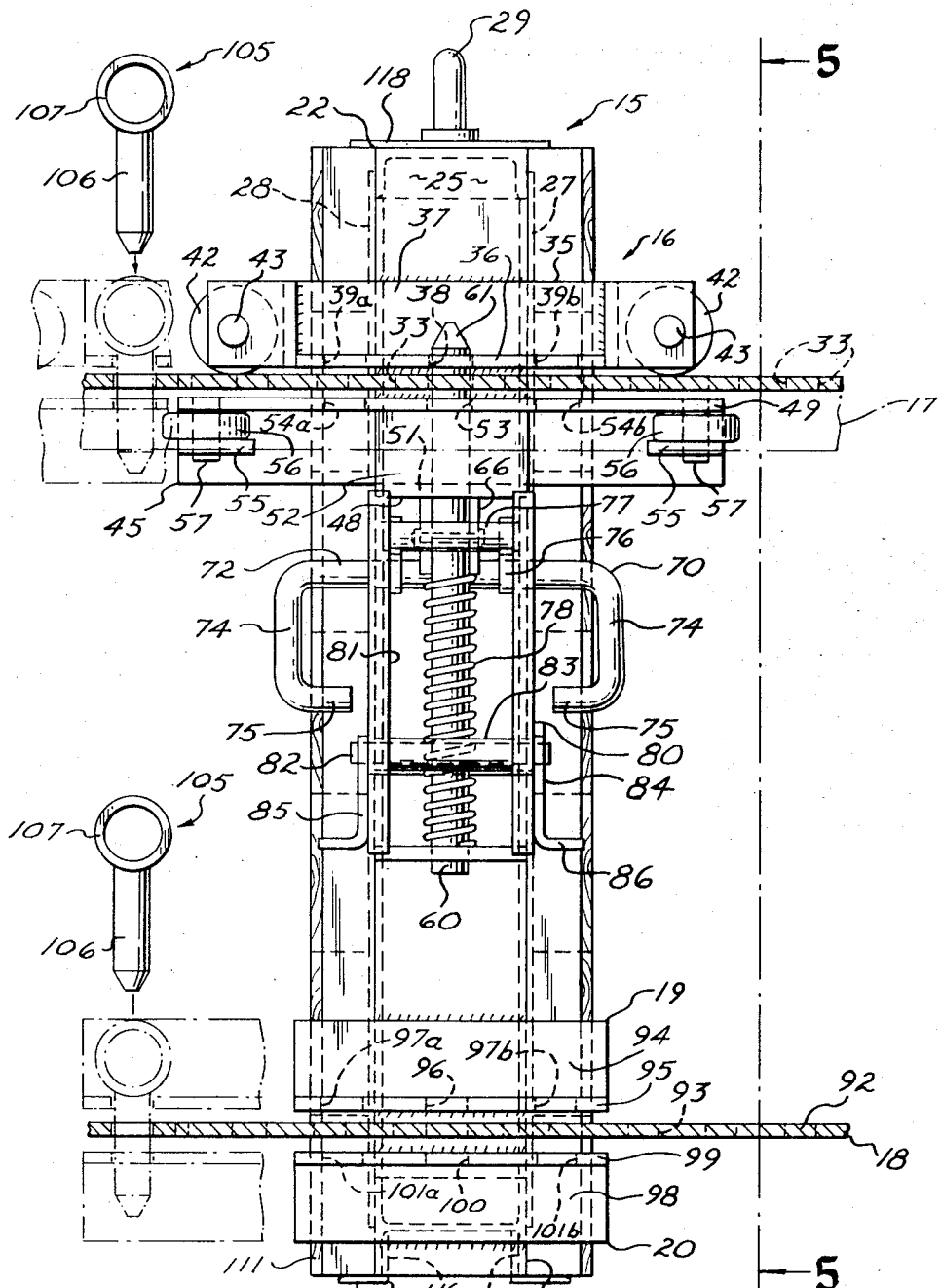
FIGURE 4 is a section taken along the line 4—4 of FIGURE 2 showing the locking means in elevation as seen looking toward one lateral end of the bulkhead.

Referring now to the drawings in all of which like parts are designated by like reference numerals, and referring more particularly to FIGURE 1, a gondola type railroad car is generally indicated at 10, said car being provided with a deck or floor 11, upstanding side walls 12, and suitable end walls one of which is shown at 13. A transversely positioned load divider in the form of a bulkhead 15 extends between the side walls 12 and is disposed parallel with the end walls 13. Said bulkhead 15 is adapted for movement longitudinally of the gondola car 10 in a direction parallel with the side walls 12 by means of load carrying carriages 16 secured to the ends of said bulkhead and adapted for rolling engagement with lineal tracks or angle rails 17 which are suitably secured to the side walls 12. As herein illustrated and described, the gondola car 10, bulkhead 15, and associated parts are preferably formed of steel whereby the same may be welded, bolted, or otherwise suitably secured together. It will be understood, however, that other suitable materials may be substituted for steel where appropriate, the exact material comprising no part of the present invention.

It will be noted that the load carrying carriages 16 are disposed at opposite lateral ends of said bulkhead 15 adjacent the upper edge thereof and hence the center of gravity of the said bulkhead is disposed below the level of said carriages. The angle rails 17 are disposed horizontally adjacent the upper edges of the side walls 12 whereby said bulkhead is generally suspended between and depending from a pair of oppositely disposed parallel angle rails 17. An angle shaped rail 18 is disposed parallel with and spaced downwardly from each of the angle rails 17, and each laterally directed side or end of said bulkhead is provided with a pair of upper and lower angle guides 19 and 20, respectively, which are disposed adjacent to the guide rails 18 to stabilize the lower end of said bulkhead and for locking said bulkhead in a predetermined position in a manner later herein described in detail.

Figure 5:
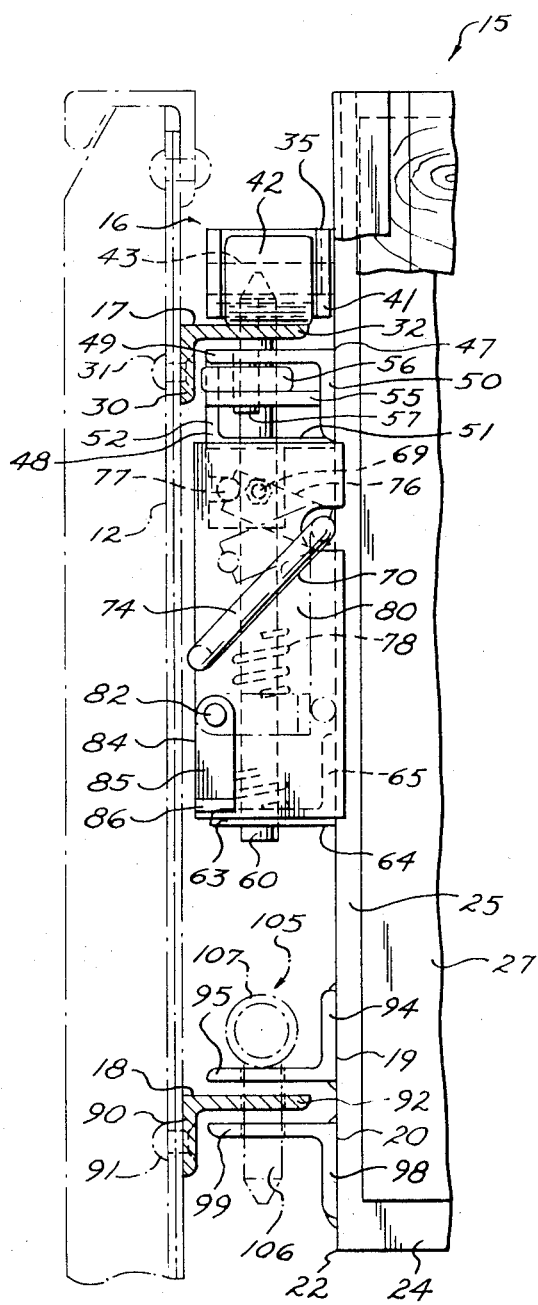
FIGURE 5 is a side elevaton of the locking means as viewed from the line 5—5 of FIGURE 4.
Figure 6:
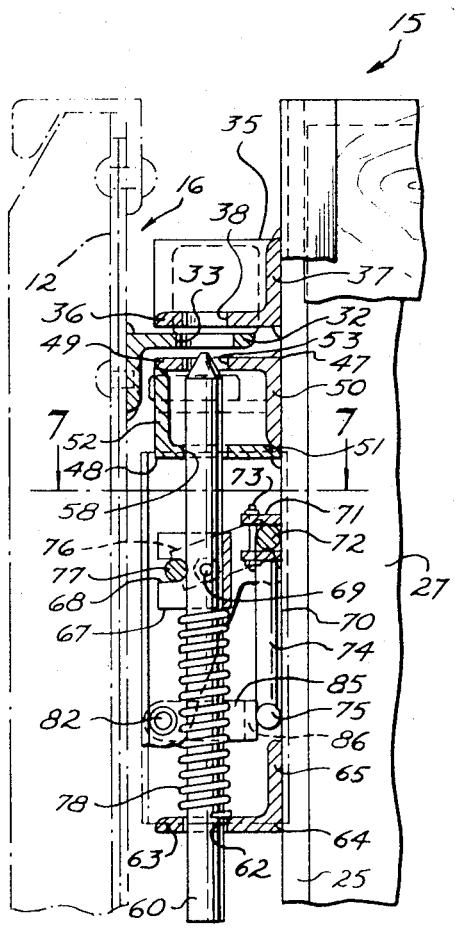
FIGURE 6 is a vertical section of the locking means of FIGURES 4 and 5 showing the parts thereof in different operative positions.
Figure 7:
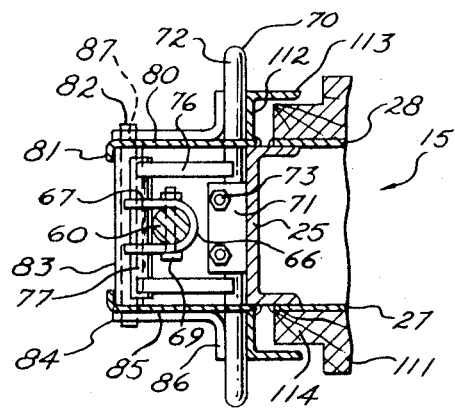
FIGURE 7 is a horizontal section taken along the line 7—7 of FIGURE 6.

Referring now more particularly to FIGURES 2 to 7, inclusive, the bulkhead 15 therein illustrated comprises a rectangular frame 22 formed from horizontal upper and lower frame members 23, 24 joined at their ends by vertical frame members 25 and 26. As shown in FIGURES 2, 3 and 7, the frame members 23, 24, 25, 26 as shown are channel-shaped in cross section with the flanges thereof directed inwardly with respect to the frame 22, the lower frame member 24 preferably having flanges directed both inwardly and outwardly. The frame 22 is preferably covered on both sides thereof by rectangular steel plates 27 and 28 which overlap the flanges of the frame members 23–26 and are preferably welded or otherwise suitably secured thereto and may be variously reinforced or formed. The lower end of the bulkhead 15 is disposed slightly above the deck 11 whereby said bulkhead may move freely along the gondola car 10.

It is sometimes desirable that the forwardly and rearwardly facing surface portions of the bulkhead 15 be of a nonmetallic substance such as wood to protect the cargo from direct contact with the metal plates 27 and 28 of said bulkhead. For this purpose in the form of the invention herein illustrated, vertically disposed angle guides 110 are provided on both sides of said bulkhead adjacent to the laterally directed ends of said bulkhead for receiving a plurality of wooden siding members 111 in stacked, edgewise relation. Each guide 110 comprises a flange 112 which is welded or otherwise suitably secured along one edge thereof to a vertical frame member 25 or 26. The flanges 112 project forwardly and rearwardly from their respective vertical frame members and have right angularly disposed, inturned flanges 113 adapted to overlap inwardly stepped end portions 114 of the siding members 111. A plurality of angled stops 115 are carried by the lower frame member 24, said angle stops each having a vertical flange 116, welded or otherwise suitably secured to the inner surface of a downwardly directed flange 24′ of said lower frame member, and a horizontal flange 117 projecting forwardly or rearwardly beyond the associated flange 24′.

The siding members 111 are mounted to the bulkhead 15 by inserting the stepped end portions into the angle guides 110 behind the flanges 113, the first such siding member being disposed with one of its longer side edges resting on the flanges 117 of the stops 115 and each successively inserting siding member resting upon the one inserted immediately therebefore. When the entire forwardly and rearwardly directed surfaces of the bulkhead are covered by the wooden siding members, said members are preferably secured against vertical displacement by elongated metal retainers 118 which are tack welded or otherwise suitably secured across the upper surfaces of the upper frame member 23. The ends of said retainers project forwardly and rearwardly above the stacked siding members 111 and prevent vertical movement thereof. The use of a plurality of siding members which are merely stacked in place has the advantage that small areas of the siding can be easily replaced thereby greatly facilitating repair to the siding.

It will be noted, as shown in FIGURES 1 and 4, that the bulkhead 15 is further provided with handle or gripping means 29 for grasping the same manually or with a mechanical device such as a hook to move said bulkhead longitudinally of the car 10.

As herein disclosed, it will be understood that the supporting and locking means associated with the laterally directed ends or sides of the bulkhead 15 are identical, hence only one such mechanism as associated with the vertical frame member 25 will be described in detail.

Each angle rail 17 comprises a vertical flange 30 secured to a side wall 12 of the car in any suitable manner, such as by means of rivets 31, and a horizontal flange 32 projecting inwardly of the car from the upper edge of the vertical flange 30. The horizontal flange 32 is provided with a plurality of preferably evenly spaced, laterally elongated apertures 33, and the centers of these as shown are spaced substantially 3¼ inches apart. Each carriage 16 comprises an angle-shaped member 35 having a horizontally disposed flange 36, adapted to be disposed and spaced slightly above the flange 32, and a vertical flange 37 welded to an edge of the adjacent vertical frame member 25 or 26 of the bulkhead. Each of said horizontal flanges 36 is provided with a centrally disposed aperture 38 and a pair of end apertures 39a and 39b, as best seen in FIGURE 2. Said apertures 38, 39a, and 39b as shown have centers spaced 4¼ inches apart whereby the distance between adjacent of these apertures is one inch greater than the distance between adjacent elongated apertures 33 of the flanges 32. At opposite ends of the said member 35 yokes 40 are provided having pairs of arms 41 between which rollers 42 are mounted upon axles 43 carried thereby. As best seen in FIGURE 5, the rollers 42 engage the upper surfaces of the horizontal, apertured flanges 32 of the angle rail 17.

As illustrated, stabilizing carriages 45 are provided below the horizontal flanges 32 of the angle rails 17, in vertically spaced relation and below the said load carrying carriages 16, one of said stabilizing carriages 45 being shown in detail in FIGURES 3, 5 and 6. Each said stabilizing carriage comprises an angle member 47 having a horizontal flange 49 projecting outwardly in the direction of the adjacent side wall 12 and a vertical flange 50 welded or otherwise suitably secured to the adjacent vertical frame member 25 or 26 of the bulkhead. As best seen in FIGURES 4–6 each said angle member 47 carries a short, centering disposed angle shaped guide member 48 having a horizontal flange 51, a distal edge of which is welded to the distal edge of the vertical flange 50, and a vertical flange 52, the distal edge of which is welded to the distal edge of the horizontal flange 49.

As shown in FIGURE 4, the angle member 47 of each stabilizing carriage 45 extends longitudinally of the car 10 a substantially greater distance than the angle member 48 and is provided with a centrally disposed aperture 53 and end apertures 54a and 54b corresponding in size and positioning with the centrally disposed aperture 38 and the end apertures 39a and 39b, respectively, of the associated horizontal flange 36 of the ends of the angle members 47, said journal members being welded to the vertical flanges 50 and spaced downwardly and parallel with the horizontal flanges 49. Rollers 56, mounted on vertical axles 57 carried by said journal members 55 and the horizontal flanges 49, are disposed for rolling engagement with the vertical flanges 30 of the angle rails 17 whereby the bulkhead 15 is stabilized against skewing with respect to the car 10 and jamming against the side walls thereof.

Referring now particularly to FIGURE 4, it will be noted that the axes of the rollers 56 of the stabilizing carriages 45 are spaced further apart and positioned in either direction along the rails 17 ahead of the rollers 42 of the carriages 16. It will be urther noted that the stabilizing carriages 45 are positioned below the level of the load bearing flanges 32 of the angle rails 17. By placing the rollers 56 ahead of the rollers 42, the lateral distance which said rollers 42 can shift with respect to the flanges 32 during any skewing action of the bulkhead is effectively reduced because said rollers 42 are disposed closer to the medial area of the carriages where the vertical axis about which the carriages tend to shift would be located. The rollers 56 are always ahead of the rollers 42 during movement of the bulkhead 15 longitudinally of the car 10 in either direction correcting any skewing action of said bulkhead and thereby minimizing the lateral distance which the load bearing rollers 42 can shift or skid.

By placing the stabilizing carriages below the load bearing flanges 32 and inserting automatic locking pins 60 (hereinlater fully described) through apertures in both carriages, said pins are engaged by the horizontal flanges 36 and 49 of said carriages 16 and 45, respectively, both above and below the flanges 32 thereby reducing the tendency to bend the ends of said automatic locking pins.

It has also been found that placing the stabilizing carriages 45 below the level of the load bearing carriages 16 produces an improved stabilizing action and a generally more smoothly acting movable bulkhead.

The improved suspension and stabilizing carriage arrangement disclosed herein is designed to give satisfactory performance over an increased period of time as compared with known mounting means. For example, in a fifty-two foot railroad car of the type referred to, initial tolerances are commonly held to only plus or minus ½ inch and it has been found that this increases with use of the car. The present arrangement of carriages above and below the tracks with the stabilizing rollers disposed ahead of the load bearing rollers is adapted to work smoothly within this wide range of tolerances.

As best shown in FIGURES 4–6, a vertically disposed, elongated, automatic locking pin 60, having a preferably frusto-conical upper end portion 61, projects upwardly through the apertures 58 in the horizontal flange 51 of the guide member 48. The lower end of each said locking pin 60 projects downwardly through an aligned aperture 62 in a horizontal flange 63 of an angle member 64, the vertical flange 65 of which is welded to the vertical frame member 25 or 26. Intermediate its ends, each said locking pin carries a U-shaped yoke 66 secured to said pin by nut and bolt assembly 69 and having arms 67 which project outwardly beyond said locking pin in the direction of the adjacent side wall 12. The yokes 66, as herein illustrated, are formed of heavy, flat sheet metal, and the arms 67 are provided with U-shaped notches 68. A handle 70 formed of heavy bar stock is pivoted to the outer face of each vertical frame member 25 or 26, between a pair of horizontally disposed, vertically spaced retainers 71 welded edgewise to said vertical frame member. An elongated, horizontal portion 72 of each said handle is disposed between the retainers 71, the outer edge portions of which carry nut and bolt assemblies 73 for retaining said horizontal portions therebetween. The horizontal portion 72 projects forwardly and rearwardly beyond the bulkhead 15, and, as best shown in FIGURE 4, each handle 70 has generally depending, parallel arms 74 having right angularly inturned end portions 75 integral therewith, one said arm being accessible from one side of said bulkhead, and the other said arm being accessible from the other side thereof.

Referring now particularly to FIGURE 7, each horizontal portion 72 of the handle 70 carries a pair of parllel, outwardly projecting arms 76 at the ends thereof, which are welded or otherwise suitably secured thereto, and the outer ends of said arms carry a small horizontally disposed cross-bar 77. Each said cross-bar is disposed within the notches 68 of the arms 67 of the associated yoke 66 whereby the pivoting of said handle about the axis of the horizontal portion 72 thereof between the full and broken line positions of FIGURE 5 causes the associated locking pin 60 to reciprocate vertically. In the full line position, each said locking pin can project upwardly through an intermediate aperture 53 in a horizontal flange 49, an aperture 33 in a horizontal flange 32, and an intermediate aperture 38 in the horizontal flange 36 of the carriage 16. In the broken line position of FIGURE 5, which is the same as the full line position of FIGURE 6, the locking pin 60 is completely clear and disposed below the flange 32 of the angle rail 17 whereby the bulkhead 15 is free to move along said rail. A heavy coil spring 78 is telescoped over each locking pin 60 and is compressively disposed between the associated horizontal flange 63 of the lower angle member 64 and the yoke 66 carried intermediately the ends of each said locking pin whereby said locking pin is urged upwardly to the full line position of FIGURES 4 and 5 which said position it will assume unless retained in some other position.

Means for retaining the handle 70 in the position shown in FIGURE 6 wherein the locking pin is retracted is best understood by reference to FIGURES 4, 5 and 7. Each locking pin 60 and associated mechanism are partly enclosed by a pair of sheet metal side covers 80 which extend between the horizontal flange 51 of the angle member 48 and the horizontal flange 63 of the angle member 64, said side covers partially overlapping the adjacent vertical frame member 25. Said pairs of side covers 80 have inturned vertical edge portions 81 and carry therebetween, adjacent to said edge portions and spaced a short distance from their lower ends, horizontal pins 82 the ends of which project outwardly beyond said side covers. A spacer sleeve 83 is telescoped over each said pin 82 between the side covers 80, and the outwardly projecting end portions of the pins 82 carry L-shaped stops 84 having elongated arms 85 and outwardly turned tabs 86. The ends of said arms opposite the tabs 86 are welded or otherwise rigidly secured with respect to the pins 82, which pins 82 are free to pivot within suitable apertures 87 provided in the side covers 80. Normally, the arms 85 hang downwardly with the tabs thereof disposed in full line position of FIGURE 5 and the position of FIGURE 4. However, when it is desired to retain a locking pin 60 in the retracted position, the associated handle 70 is pivoted whereby the arms 74 thereof are in the position shown in FIGURE 6, and the arms 85 of the stops 84 are then pivoted to the full line position of FIGURES 6 and 7 and the broken line position of FIGURE 5. This brings the tabs 86 in overlapping relationship with the inturned end portions 75 of the handle 70 whereby said handle, being urged in a clockwise direction as shown in FIGURES 5 and 6, will press resiliently against said end tabs with sufficient frictional contact to prevent the arms 85 from dropping back down to their vertical position. When both locking means at both ends of the bulkhead are in the above described position, the bulkhead 15 may be adjusted longitudinally of the gondola car 10 to any desired position. During such longitudinal movement, the angle guides 19 and 20 also move longitudinally with respect to the guide rails 18. As shown in FIGURE 5, the guide rails 18 are substantially similar to the angle rails 17 disposed thereabove, each said guide rail 18 having a vertical flange 90 secured to the adjacent side wall 12 by any suitable means such as rivets 91. Each guide rail 18 also has a horizontal flange 92 which is provided with a plurality of evenly spaced, laterally elongated apertures 93 of the same shape and size as the apertures 33 of the horizontal flange 32 of the angle rail 17. The apertures 93 are placed on the 3¼ inch centers recited above in the same manner as and in line with the apertures 33. The angle guides 19 and 20 have upwardly and downwardly directed vertical flanges 94 and 98 and laterally projecting horizontal flanges 95 and 99, respectively, said horizontal flanges 95 and 99 being disposed above and below the horizontal flange 92 of the adjacent guide rail 18 and overlapping said last mentioned horizontal flanges. As shown in dotted lines in FIGURE 4, the horizontal flange 95 of the angle guide 19 has an intermediate aperture 96 and end apertures 97a and 97b, and the horizontal flange 99 of the angle guide 20 has an intermediate aperture 100 and end apertures 101a and 101b, aligned with and corresponding to the intermediate apertures 38 and 53 and the end apertures 39a, 39b and 54a, 54b, respectively. Each set of apertures 38, 39a, 39b of the carriage 16, apertures 53, 54a, 54b of the stabilizing carriage 45, apertures 96, 97a, 97b of the angle guide 19, and apertures 100, 101a, 101b are all located on 3¼ inch centers, whereas the elongated apertures 33 and 93 of the angle rail 17 and the guide rail 18, respectively, are located on 4¼ inch centers. This enables the bulkhead 15 to be adjusted along the gondola car 10 at increments of 1 inch by aligning a pair of elongated apertures 33 and 93 with either the *a* or *b* apertures of the carriage and angle guides and inserting therein a manual locking pin such as those shown at 105 in FIGURE 4. Each manual locking pin as herein disclosed comprises a shaft 106 for inserting through the aligned apertures and a cylindrical gripping portion 107 for grasping and manual manipulation.

It will be noted that when the manual locking pins 105 are used, the automatic locking pins 60 are out of alignment with any of the elongated apertures 33. If, at this time, either pair of stops 84 should drop downwardly or in any manner be moved downwardly to release the handle 70, the associated automatic locking pin would merely be driven upwardly by a spring 78 until its upper end contacts the lower surface of the horizontal flange 32 of an angle rail 17. However, if after the gondola car 10 is empty the manual pins 105 should be removed thereby allowing the bulkhead 15 to roll freely, said bulkhead could only move to the point where the said automatic locking pin 60 is aligned with one of the apertures 33 at which point said pin would be driven upwardly into said aperture to stop the bulkhead. This would prevent dangerous free rolling of the bulkhead if the car 10 is suddenly started, or stopped, or otherwise jolted.

Under ordinary operating conditions, the stops 84 hold the handles 70 in the retracted position thereby allowing manual or mechanical positioning of the bulkhead 15 without actuation of the automatic locking means. Thus, by removing the manual locking pins 105, said bulkhead can be adjusted along the car 10 and then locked in any adjusted position by replacing said manual locking pins. However, if said manual locking pins are not in locked position and the car is suddenly moved or jolted in such manner as to cause the bulkhead 15 to roll freely, such movement or jolt will jar the stops 84 loose from the handles 70 and cause them to drop down whereby the automatic locking pins are actuated as described above. From the foregoing it will be seen that the stops 84 provide means for ordinarily retaining the handle 70 in the retracted position, and the safety mechanism will be automatically tripped when a bulkhead which has inadvertently been left free to roll in an empty car is jolted or jarred.

What I claim is:

1. In load conveyancing means having laterally spaced, parallel side walls and a transverse, movable bulkhead extending between said side walls for adjustably dividing the load volume, horizontal rails having wheel bearing surface means disposed adjacent to the inner surfaces of said side walls; said rails comprising angle shaped members having vertical flanges secured flatwise to said side walls and horizontal flanges projecting inwardly from said side walls; carriage means carried at the laterally directed sides of said bulkhead; each said carriage means having a first carriage carrying first wheel means disposed on transverse horizontal axes and spaced longitudinally along said wheel bearing surface means; each said carriage means having a second carriage carrying second wheel means disposed on vertical axes and spaced longitudinally along said side walls to prevent skewing of said bulkhead; said second wheel means being spaced below the level of said first wheel means; the axes of said second wheel means being spaced ahead of the axes of said first wheel means in either direction of travel of said bulkhead; said rails being disposed at a level between said first and second carriages and said second wheel means engaging the inner surfaces of said vertical flanges; locking means carried by said bulkhead adapted to engage means carried by said rails for preventing free movement of said bulkhead within said conveyancing means; each said locking means comprising a pin; means biasing said pin in the direction of said rail; means defining a plurality of openings spaced along each rail and adapted to receive the pin disposed adjacent thereto; and means for holding each said pin in a retracted position whereby said pin is disengaged from any of said openings, said last mentioned means adapted to automatically release said pin whenever said bulkhead is jolted whereby said pin enters the first said opening aligned therewith and stops movements of said bulkhead.

2. In load conveyancing means as set forth in claim 1: said first and second carriages having generally horizontal flange means overlapping said horizontal rails above and below said rails, respectively; means defining aligned apertures in said flange means adapted to align with said openings in said rails; said pin adapted upon release thereof to project through said aligned apertures and one of said openings.

3. In load conveyancing means as set forth in claim 2: said means for holding each said pin comprising handle means for moving said pin to said retracted position; freely pivoted stop means carried adjacent to said handle and pivotable about a generally horizontal axis to a position against said handle to prop said handle in said retracted position, said stop means being positioned with a major portion of its mass disposed laterally of its pivot axis in said propped position and tending to pivot downwardly by the pull of gravity to release said handle whereby a jolt of said bulkhead causes said stop means to drop and allow said pin to move into engaged position with said apertures and one of said openings.

4. In load conveyancing means as set forth in claim 3: each said handle means comprising a horizontal pivot portion pivoted to a laterally directed side of said bulkhead and disposed parallel with said side walls, said pivot portion extending forwardly and rearwardly beyond said bulkhead; said pivot portion having angularly disposed arms at the ends thereof accessible from both the front and rear sides of said bulkhead; said arms adapted to be pivoted to a downwardly directed position; said stop means pivoted about an axis parallel with the axis of said pivot portion and having a portion adapted to prop said arms in said downwardly directed position.

5. In load conveyancing means having laterally spaced, parallel side walls and a transverse, movable bulkhead extending between said side walls for adjustably dividing the load volume, horizontal rails having wheel bearing surface means disposed adjacent to the inner surfaces of said side walls; carriage means carried at the laterally directed sides of said bulkhead; each said carriage means having a first pair of wheel means disposed on transverse horizontal axes and spaced longitudinally along said wheel bearing surface means; each said carriage means having a second pair of wheel means disposed on vertical axes and spaced longitudinally along said side walls to prevent skewing of said bulkhead; the axes of said second wheel means being spaced ahead of the axes of said first wheel means in either direction of travel of said bulkhead; locking means carried by said bulkhead adapted to engage means carried by said rail for preventing free movement of said bulkhead within said conveyancing means; said bulkhead having a pair of complementary vertical guideways projecting from a face of said bulkhead disposed at right angles to said side walls, said guideways being disposed adjacent to the laterally directed sides of said bulkhead; a plurality of elongated siding members having the ends thereof slidably engaging said guideways whereby said siding members are stacked edgewise in front of said face; and stop means carried at the bottom edge of said bulkhead to support the lowermost of said siding members.

6. In load conveyancing means having laterally spaced, parallel side walls, a transverse bulkhead extending between said side walls; parallel, horizontal rails carried by said side walls and disposed longitudinally of said conveyancing means; wheel means carried by the laterally directed sides of said bulkhead for engaging said rail whereby said bulkhead is movable longitudinally of said conveyancing means for adjustably dividing the load volume therein; automatic locking means carried by said bulkhead adjacent to said rails; each said automatic locking means comprising a pin; means biasing said pin in the direction of said rail; means defining a plurality of openings spaced along each rail and adapted to receive the pin disposed adjacent thereto; and means for holding each said pin in a retracted position whereby said pin is disengaged from any of said openings, said last mentioned means adapted to release said pin whenever said bulkhead is jolted whereby said pin enters the first said opening aligned therewith and stops movement of said bulkhead.

7. In load conveyancing means as set forth in claim 6: each said rail comprising a substantially flat, horizontal member projecting inwardly of the conveyancing means; said openings extending vertically through each said flat rail; flange means carried by said bulkhead and overlapping above and below said rail; means defining aligned apertures in said flange means adapted to align with said openings in said rail; said pin adapted upon release thereof to project through said apertures and an aligned one of said openings.

8. In load conveyancing means as set forth in claim 7: said means for holding each said pin comprising handle means for manually moving said pin to said retracted position; freely pivoted stop means carried adjacent to said handle and pivotable about a generally horizontal axis to a position with the distal end thereof against said handle to prop said handle in said retracted position; said stop means being positioned with a major portion of its mass disposed laterally of its pivot axis in said propped position and tending to drop downwardly by the pull of gravity to release said handle whereby a jolt of said bulkhead causes said stop means to drop and allows said pin to move into engaged position with said apertures and one of said openings.

9. In load conveyancing means as set forth in claim 8: each said handle means comprising a horizontal pivot portion pivoted to a laterally directed side of said bulkhead and disposed parallel with said side walls, said pivot portion extending forwardly and rearwardly beyond said bulkhead; said pivot portion having angularly disposed arms at the ends thereof accessible from both the front and rear sides of said bulkhead; said arms adapted to be pivoted to a downwardly directed position; said stop means pivoted about an axis parallel with the axis of said pivot portion and having a portion adapted to prop said arms in said downwardly direct position.

10. In load conveyancing means having laterally spaced, parallel side walls and a transverse, movable bulkhead extending between said side walls for adjustably dividing the load volume, means for mounting the laterally directed ends of said bulkhead for movement horizontally in a direction parallel with said side walls, at least one of said means comprising a horizontal rail disposed adjacent to the inner surface of one side wall; first carriage means fixed to one end of said bulkhead, said first carriage means having a pair of wheel means disposed on transverse horizontal axes engaging the upper surface of said rail and spaced ahead of said bulkhead in either direction of travel thereof; second carriage means fixed to said bulkhead, said second carriage means having a pair of wheel means disposed on vertical axes and engaging vertical surface means fixed with respect to said one side wall and disposed below said rail; the axes of said second wheel means being spaced ahead of the axes of said first wheel means in either direction of travel of said bulkhead; means defining a plurality of vertically directed opening means in said rails spaced longitudinally therealong; locking pin means carried by said one end of said bulkhead and adapted to engage a selected one of said opening means to retain said bulkhead against movement along said rail; means biasing said locking pin means toward the engaged position; and means for retaining said locking pin means in the disengaged position, said last mentioned means adapted to release said locking pin means when said bulkhead is jolted whereby said locking pin means moves automatically into engaged position upon alignment of said locking pin means with one of said opening means.

11. Means for adjustably dividing a load volume having laterally spaced, parallel side walls, said means comprising a transverse, movable bulkhead extending substantially the full distance between said side walls; a horizontal rail carried along the inner surface of each said side wall, said rails having wheel bearing surface means extending parallel with said side walls; means defining a plurality of vertically directed opening means in said rails spaced longitudinally therealong; wheeled carriage means fixed to the laterally directed ends of said bulkhead and engaging said surface means for movement of said bulkhead along said rails in its transverse orientation to vary the storage volume in either side of said bulkhead; pin receiving means carried by said bulkhead and projecting laterally in overlapping relation to said rails; means defining opening means in said pin receiving means positioned for selective alignment with one of said first mentioned opening means; movable locking pin means carried at the ends of said bulkhead and adapted to engage a selected one of said first mentioned opening means and said second mentioned opening means to retain said bulkhead against movement along said rails; means biasing said pin means toward the engaged position; handle means for moving said pin means against said biasing means to a disengaged position; freely pivoted stop means carried at the ends of said bulkhead and pivotable about a generally horizontal axis to a position against said handle to prop said handle in the disengaged position, said stop means being positioned with a major portion of its mass disposed laterally of its pivot axis in said propped position whereby said stop means tends to pivot downwardly by the pull of gravity to release said handle whereby a jolt of said bulkhead will cause said stop means to drop and allow said pin means to move into engaged position upon alignment of any combination of first and second mentioned opening means.

References Cited

UNITED STATES PATENTS

| | | | |
|---|---|---|---|
| 2,517,823 | 8/1950 | Angell | 105—376 |
| 3,017,842 | 1/1962 | Nampa | 105—376 |
| 3,218,987 | 11/1965 | Michel | 104—98 |
| 3,298,143 | 1/1967 | Rogers et al. | 105—376 X |

DRAYTON E. HOFFMAN, Primary Examiner

U.S. Cl. X.R.

16—106; 104—93; 105—150, 369